(12) United States Patent
Steinke

(10) Patent No.: US 6,561,058 B1
(45) Date of Patent: May 13, 2003

(54) CUSHIONING HAND GRIP

(76) Inventor: Richard A. Steinke, 705 Yucca St., Boulder City, NV (US) 89005

( * ) Notice: Subject to any disclaimer, the term of this patent is extended or adjusted under 35 U.S.C. 154(b) by 0 days.

(21) Appl. No.: 09/716,110

(22) Filed: Nov. 20, 2000

(51) Int. Cl.[7] .............................................. B62K 21/26
(52) U.S. Cl. ...................... 74/551.9; 74/551.8; D8/303
(58) Field of Search ............................ 74/551.9, 551.1, 74/558.5; 145/62; 428/35.2; 16/110 R; D8/303

(56) References Cited

U.S. PATENT DOCUMENTS

| | | | | |
|---|---|---|---|---|
| 3,344,684 A | * | 10/1967 | Steere et al. ................ | 74/551.9 |
| 4,416,166 A | * | 11/1983 | Jannard et al. ............ | 74/551.9 |
| 4,452,289 A | * | 6/1984 | Smith ........................... | 145/62 |
| 4,535,649 A | * | 8/1985 | Stahel .................... | 74/551.1 X |
| 5,125,286 A | * | 6/1992 | Wilson ...................... | 74/558 X |
| 5,556,092 A | * | 9/1996 | Theken .................. | 16/110 R X |
| 5,846,145 A | * | 12/1998 | Tinlin ......................... | 473/550 |
| 5,893,297 A | * | 4/1999 | Rowe ......................... | 74/558.5 |
| 6,035,742 A | * | 3/2000 | Hollingsworth et al. ... | 74/551.9 |
| 6,153,277 A | * | 11/2000 | Chang ........................ | 428/35.2 |
| 6,276,231 B1 | * | 8/2001 | Yamane ....................... | 74/551.9 |

FOREIGN PATENT DOCUMENTS

| | | | | |
|---|---|---|---|---|
| JP | 3-136992 | * | 6/1991 | ................ 74/551.9 |
| WO | PCT/BR85/00012 | * | 7/1987 | ................ 74/551.9 |

* cited by examiner

Primary Examiner—Vinh T. Luong
(74) Attorney, Agent, or Firm—M. Reid Russell

(57) ABSTRACT

A cushioning hand grip formed from a polymer material having a vio-elastic character whereby the grip will exhibit nearly perfect (less than two (2) percent of an applied force only is not cushioned) recovery or compression set, provides, even when wet, a tacky surface that will adhere to an operators hand closed therearound and, additionally, provides a non-slip adherence to a handle bar end whereover the grip is fitted. The grip is formed as a cylinder that may include a liner, such as a nylon sleeve, wherearound the grip is formed, and preferably includes an end cap arranged for locking into a handle bar end, maintaining the grip fitted onto that handle bar. For ease of gripping the grip outer cylindrical surface includes lateral and longitudinal rows of spaced dimples formed therein, with grooves between which dimples for channeling water or allowing as air flow to pass therethrough. The dimples to receive and support fingers of an operators hand closed around the grip, somewhat compressing the dimples that provide cushioning and shock adsorption, minimizing operator fatigue.

8 Claims, 4 Drawing Sheets

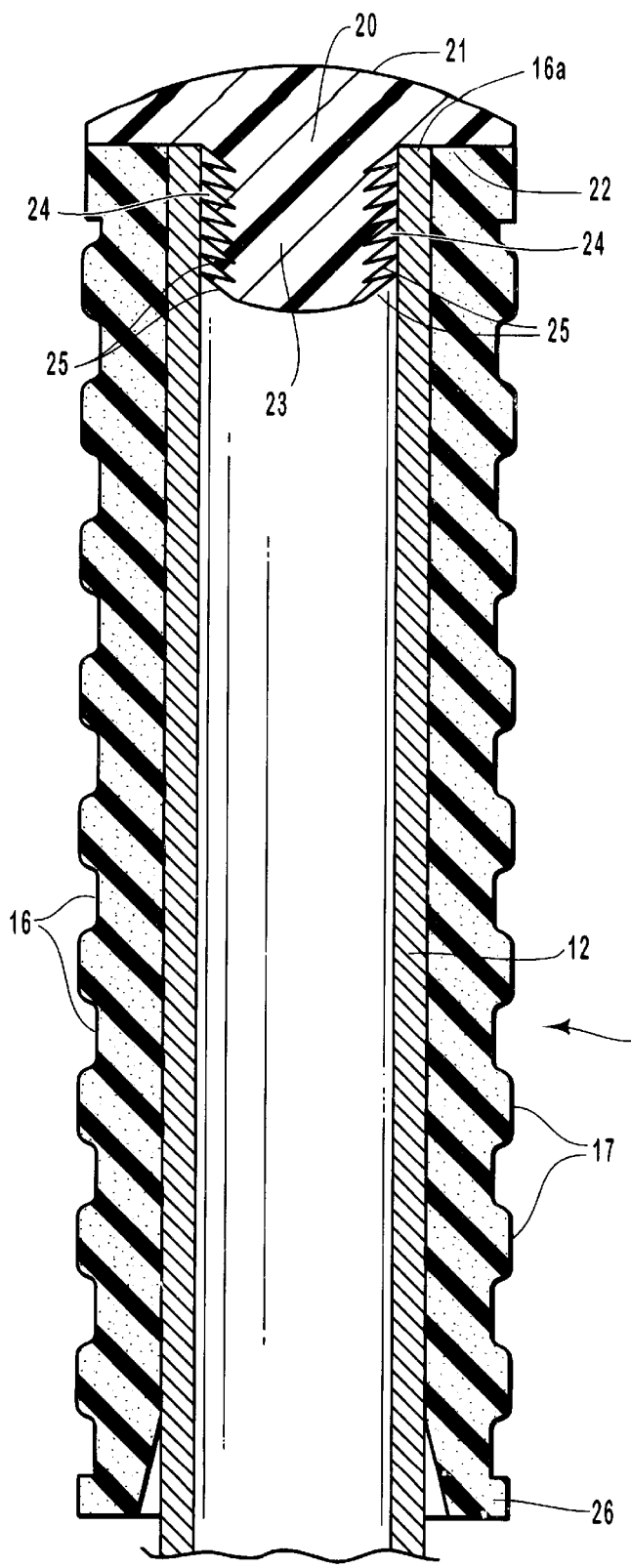
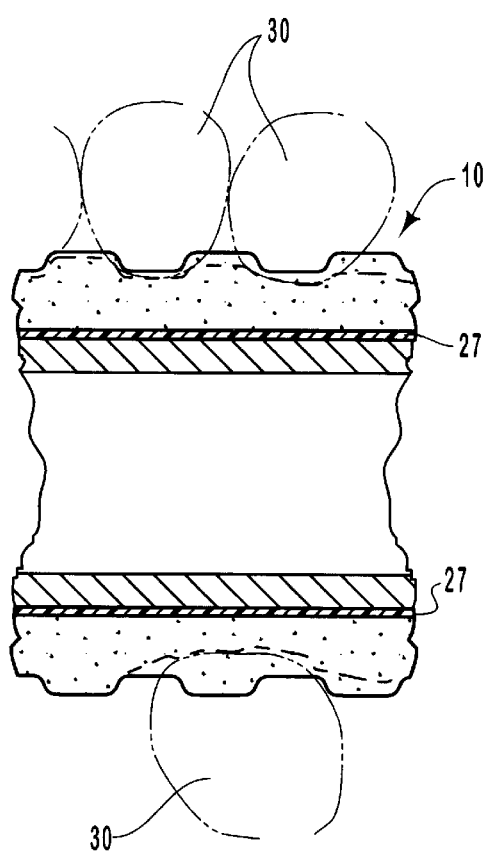
FIG. 7
FIG. 8

CUSHIONING HAND GRIP

BACKGROUND OF THE INVENTION

1. Field of the Invention

This invention pertains to grips for fitting onto hand gripping portions of devices, such as bicycle handle bars, jack hammer handle ends, and the like, to provide operator hand cushioning for comfort and to relieve hand fatigue, and as non-slip hand gripping surfaces.

2. Prior Art

The present invention contemplates a hand grip for use as a shock absorbing cushion between an operator's hand and a handle segment of a device as experiences shock and/or vibration, to dampen forces as are directed through the handle bar prior to their passage into the operators hand. Where, of course, hand grips are commonly fitted to bicycle handle bars, jack hammer handle segment ends, and the like, such have not, prior to the invention, provided for almost a total cushioning of shock forces as are directed into the hand grip, to dampen such shock forces as are passed through the handle or handle bar ends into the operators hands, to significantly lower operator hand fatigue and prevent injury. Which grip of the invention, by its design and the materials wherefrom it is formed, when wet, provides a non-slip surface to facilitate the operator maintaining a secure grip thereon.

SUMMARY OF THE INVENTION

It is a principal object of the present invention to provide a shock and vibration dampening hand grip for installation over ends of a bicycle handle bar, jack hammer operator handle or control bar, or the like, that an operator grips.

Another object of the present invention is to provide a hand grip, for installation in pairs, onto ends of a handle bar of a bicycle, jack hammer, or the like, which grip is formed of a material capable of both cushioning and dampening forces as are directed through the bar ends into the grips, with a preferred material being a polymer compound having a vio-elastic character that is formed into an open cylinder of a diameter to slide over and adhere onto handle bar or handle ends, and is capped.

Still another object of the present invention is to provide, on the cushioning hand grip outer surface, an arrangement of longitudinal rows of square, spaced apart, dimples that each stand outwardly approximately one thirty second (1/32) to one eighth (1/8) of an inch from the cylinder surface, and including continuous depressions alongside the dimples that channel liquid, such as sweat, across and along the grip surface, away from where the operators fingers that engage and squeeze around the grip, in contact with the dimples.

Still another object of the present invention is to provide square dimples where the continuous depressions between which dimples align longitudinally and laterally to provide straight flow paths therealong and thereacross.

Still another object of the present invention is to provide hand grips formed from a selected polymer compound having a vio-elastic character that both cushions and dampens forces as are directed therein and provides, when wet, a non-slip surface to the operators hand.

In accordance with the present invention, a new and improved hand grip is provided that is preferably formed from a polymer material compound having a vio-elastic character, is selected to achieve a non-slip adherence to a hand gripping bar or tube whereover it is fitted and will afford both flexure and shock absorbency to the hand of an operator gripping the hand grip. The hand grip of the invention is formed as a cylinder of a diameter to slide over a handle bar end and includes a cap fitted across its open end that engages and binds into the handle bar end. Preferably, each hand grip of the invention is formed to have a smooth inner surface for fitting over the bar end, that may be reinforced as with a nylon sleeve, or the like, and includes spaced longitudinal rows of square dimples formed around and along the outer surface of the cylinder. So arranged, the square dimples are spaced equal distances apart from one another extending across and along the cylinder, and may include a straight raised longitudinal section wherein the name of the grip is scribed. In practice, the dimples and the raised longitudinal section are of uniform height above the cylinder outer surface of from one thirty second (1/32) to one eighth (1/8) of an inch, with the grooves or channels between which dimples to provide flow paths for moisture, including an operators sweat.

Preferably, a polymer material having a vio-elastic nature that will exhibit nearly perfect (less than two (2) per cent of an applied force is not cushioned) recovery or compression set, is used in a manufacture, by molding methods, of the hand grip of the invention. In practice, a vio-elastic material that is an elastomer polymer compound of OH (hydroxyl) containing polymers that will react with an NCO, such as methylene diisocyanate, containing isocyanates, has been used to form the hand grip of the invention.

DESCRIPTION OF THE DRAWINGS

The invention may take physical form in certain parts and arrangement of parts, and preferred embodiments of which will be described in detail in this specification and illustrated in the accompanying drawings which form a part hereof:

FIG. 7 is an enlarged longitudinal sectional view taken along the line 7—7 of FIG. 1; and FIG. 8 shows a side elevation view of a section of the cushioning hand grip of FIG. 7 mounted onto the end of the bicycle handle bar of FIG. 1, showing, in broken lines, the fingers of an operator's hand wrapped there around, and additionally showing the grip as including an internal sleeve molded therein that is in engagement with the handle bar end surface.

DETAILED DESCRIPTION

Figure 1:
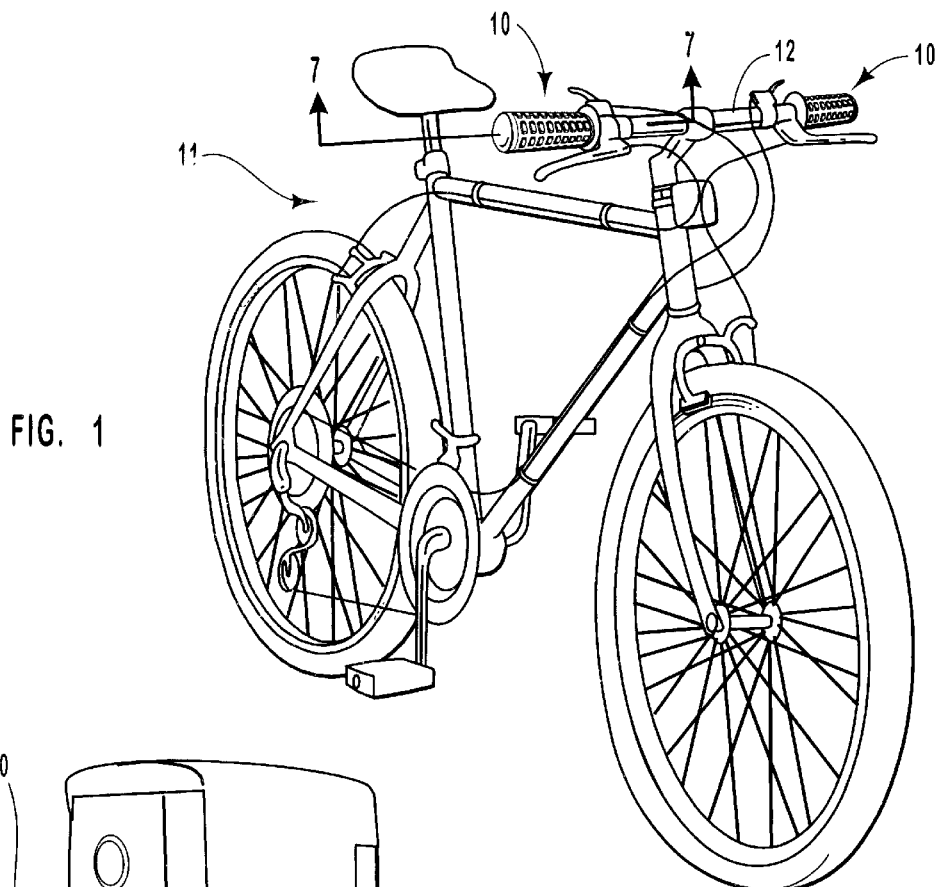
FIG. 1 is a profile perspective view of a bicycle having a handle bar on whose ends the cushioning hand grips of the invention are mounted.

The invention is in a cushioning hand grip 10 for fitting over handle bar ends as an operator grips, such as a bicycle handle bar, jack hammer handle bar, or the like. The cushioning hand grip 10, as shown in the enclosed FIGS. 1 through 7, is formed as a cylinder from an elastomer polymer compound that is selected to have a vio-elastic character, that exhibits both flexure and resiliency and is some what tacky to grip by an operators hand, even when the grip outer surface is wet or damp. In practice, a polymer material having a vio-elastic nature that exhibits a nearly perfect (less that two (2) per cent of an applied force is not cushioned) recovery or compression set is preferred. One such vio-elastic material, that is preferred, and has been used in practice is an elastomer polymer compound of OH (hydroxyl) that contains polymers that are reacted with an NCO, such as Methylene Diisocyanate, and contains isocyanates, and provides a tacky surface consistency for enabling the operator to comfortable maintain his hand around the grip and will exhibit the preferred vio-elastic character.

The cushioning hand grip 10 is preferably formed from the above described vio-elastic elastomer polymer that is selected to have a molecular weight of from one thousand (1,000) and up to and including six thousand (6,000), and is preferably made up of polymers of a diol or two (2) functionally, or a triol or three (3) functionally, or a combination of diols and/or triols. The compound preferably includes a chain extender or cross linking polyol having, preferably, a molecular weight in a range of from sixty (60) to six hundred (600); employs a catalyst that is preferably an amine such as one used in combination with a heavy metal catalyst, such as iron, tin, lead, or the like; and preferably includes; as an isocyanate, the above set out Methylene Diisocyanate (MDI), that has an isocanate equivalent of from one hundred twenty five (125) to three hundred (300), or the like. Such vio-elastic polymer will have a rapid and nearly perfect recovery after compression to provide exceptional shock absorbency and will exhibit non-slip grip surface characteristics.

Figure 2:
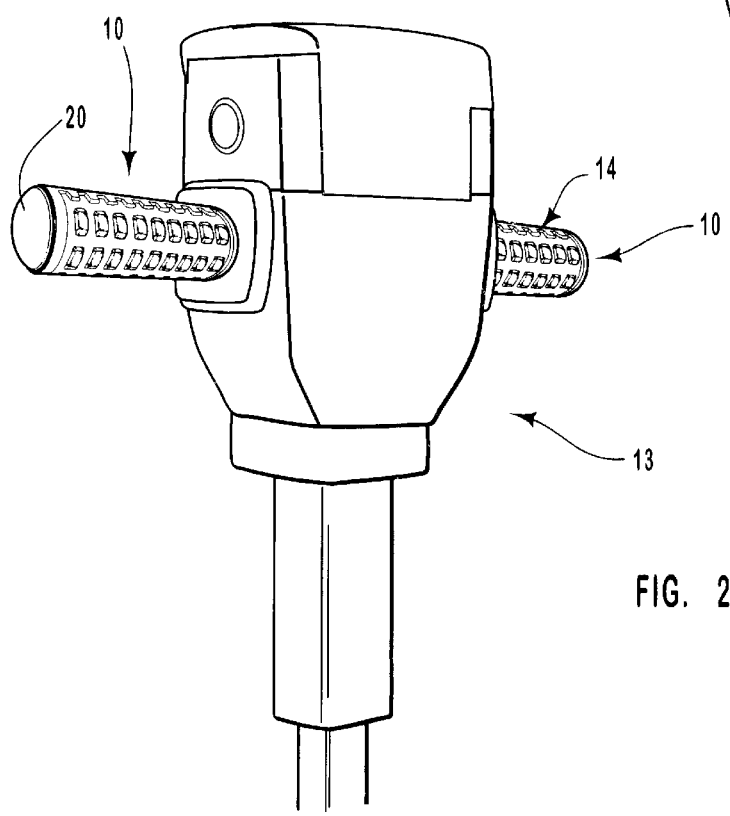
FIG. 2 is an side and front elevation view of the top portion of a jack hammer showing a handle bar on whose ends the cushioning hand grips of the invention are mounted.

The cushioning hand grip 10, shown in FIGS. 1 and 2, can be fitted onto ends of a bicycle 11 handle bar 12, to the ends of a jack hammer 13 handle bar 14, or other like arrangement where is it desired to provide grip cushioning to hand engaging portions of a vibrating or oscillating device. The cushioning hand grip 10 of the invention that is preferably manufactured from a polymer material that is vio-elastic, will both absorb and cushion shock forces from the handle bar as would otherwise travel into the operators hands. By so protecting an operators hands from shock forces, the operator will less readily experience hand fatigue or injury to their hands, such as carpal shock syndrom.

Figure 3:
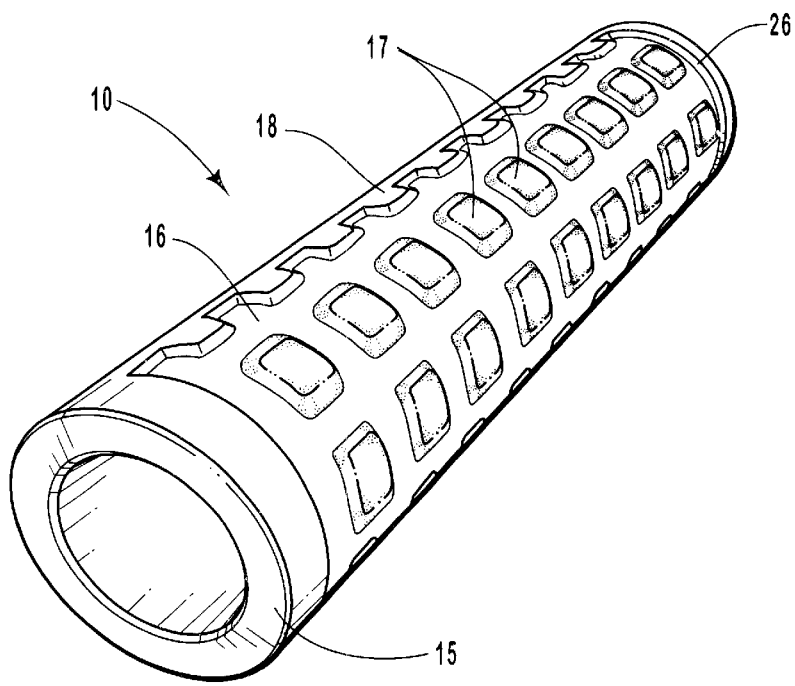
FIG. 3 is an outer end perspective view of a cushioning hand grip of the invention.
Figure 4:
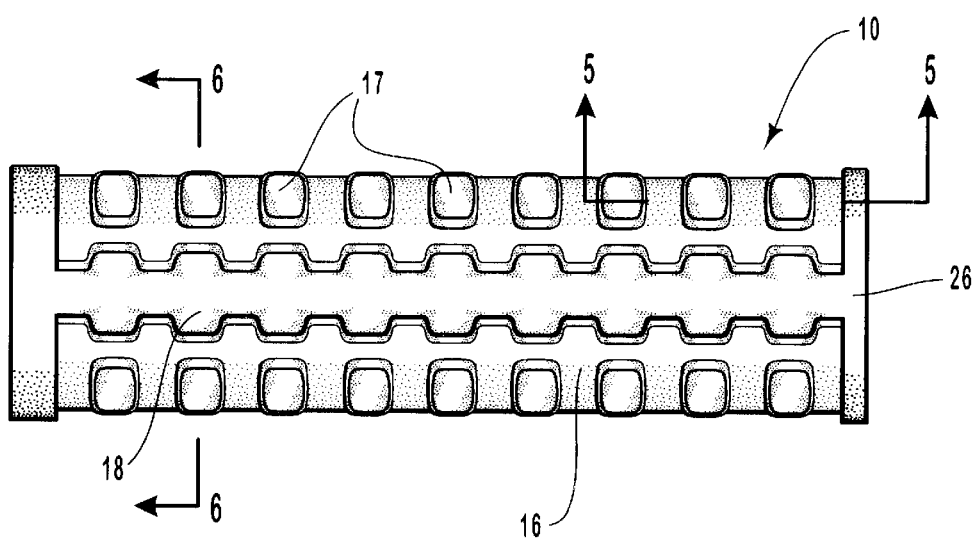
FIG. 4 is a side elevation view of the cushioning hand grip of FIG. 3.
Figure 5:
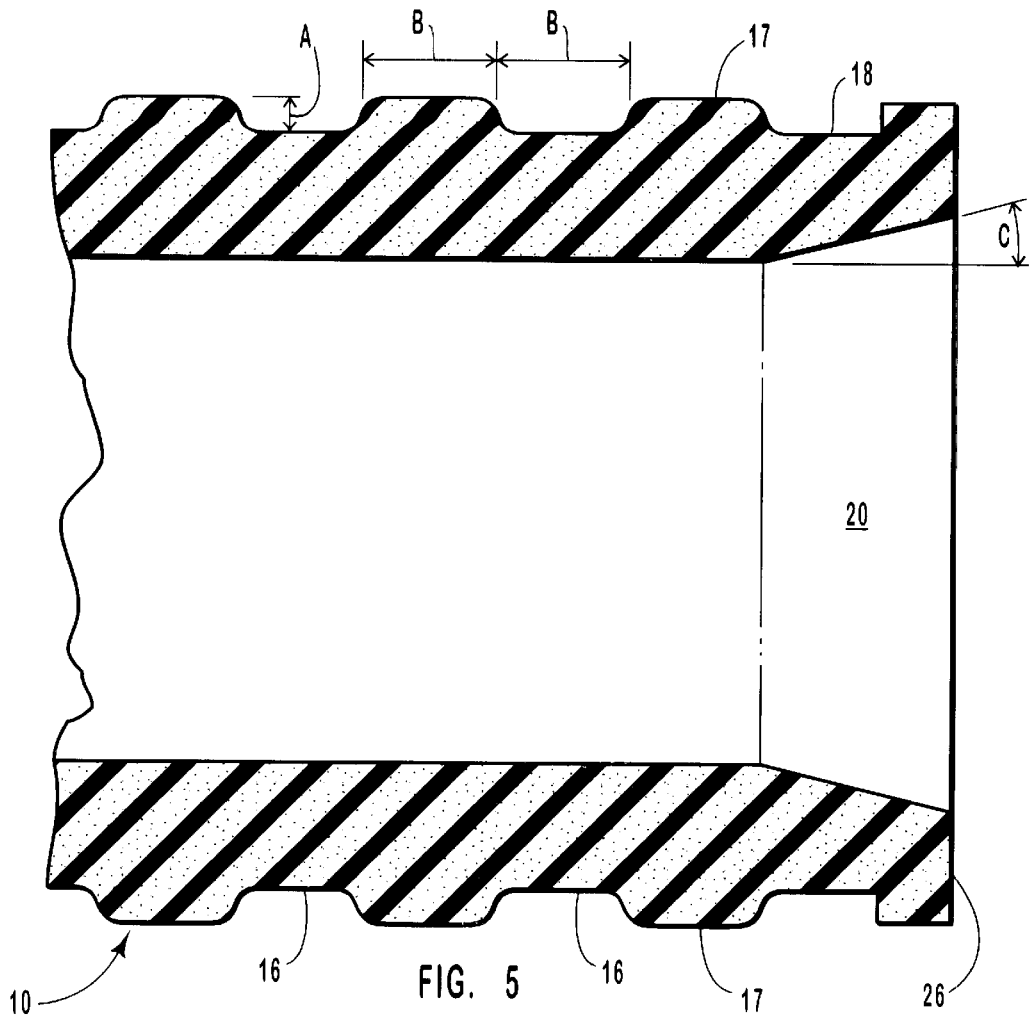
FIG. 5 is a top plan sectional view taken along the line 5—5 of FIG. 4, showing a grip inner end surface.
Figure 6:
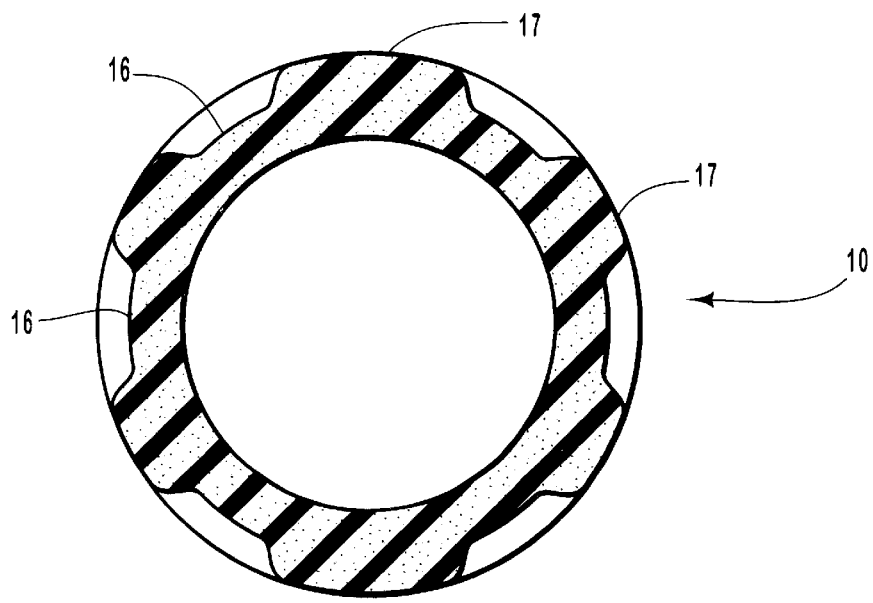
FIG. 6 is a cross sectional view taken along the line 6—6 of FIG. 4.

FIGS. 3 and 4 show the cushioning hand grip 10 formed as a hollow cylindrical body 15 having inner and outer cylindrical surfaces, with the diameter of the inner cylinder being of a diameter to conveniently stretch over to slide along the surface of a handle bar end whereover the grip is to be slid. The outer cylindrical surface 16 of the cylindrical body 15 is essentially flat and includes spaced dimples 17 that extend outwardly therefrom, along with a longitudinal ridge 18, that is an optional inclusion and is shown as a line of dimples with the areas between which dimples filled in. In practice, as shown, square dimples of a length and width of approximately one quarter (¼) inch on each side, shown as distance B in FIG. 5, have been employed. The dimple shape, it should be understood, is a matter of design choice and other shapes, such as a round or triangular shaped dimple, could be so employed, provided aligned gaps or spaces are arranged between the dimples for channeling water and air flows therealong, as described herein. The dimple height above the cylinder 15 outer surface 16 is illustrated as a distance A and, in practice, is from one thirty second (1/32) to one eighth (⅛) of an inch, with the preferred height being one sixteenth (1/16) of an inch. So arranged, as shown in FIG. 5, channels are provided between the raised dimples 17, and the dimple width and distance to an adjacent dimple is approximately three quarters (¾) of an inch. In practice, the dimple width is approximately the same distance as the channel width, illustrated also as distance B, through, it should be understood, the dimple and channel widths can be varied within the scope of this disclosure. The channels between dimples are provided to direct water, such as the operators sweat, therealong, and to allow an air to pass beneath the operators fingers that are wrapped around the cushioning hand grip, as illustrated in FIG. 8.

The cushioning hand grip 10 can be formed to have the spaced dimples 17 over its entire cylindrical surface or may include a continuous longitudinal strip of the width of a dimple along its entire length, as shown at 18 in FIG. 4. Which bar 18 is to receive a product name scribed thereon, within the scope of this disclosure. With the grip 10 manufactured from the preferred polymer material, even when wet, the grip dimple surfaces will provide a tacky feel to the operators fingers, mitigating against finger slippage from around the grip.

The cushioning hand grip 10, formed from the preferred polymer material, as set out above, is both soft and flexible. To facilitate its passage over a handle bar end, like the bicycle handle bar 12 end of FIG. 1, an end section 20 of the interior of grip 10, that is back from grip end 26, as shown best in FIG. 5, is sloped from a distance of approximately one half (½) inch back from its end 26 as the grip end as is first slipped onto the handle bar end. Which taper is shown as angle C that is approximately an angle of fifteen (15) to twenty (20) degrees from the horizontal to end 26, and is provided to facilitate slipping the grip 10 onto the handle bar end. For the grip 10 of FIGS. 1 through 7, the inner surface of the cylinder 16 is not reinforce or lined, as with a stiff material. So arranged, the grip installed on a handle bar 12 end, as shown in FIG. 7, may tend to slide therealong. To prevent such slippage, the cushioning hand grip 10 preferably includes a cap 20, that is preferably formed from a hard plastic material, as shown also in FIGS. 1 and 2, and has a broad head end 21 that is preferably curved to have a dome shape, and flat lower face 22. The cap includes a centered cylindrical shaft 23 extending at a right or normal angle from the cap lower face 22, that includes teeth 24 projecting outwardly from around the shaft surface. Which teeth 24 preferably each have a surface 25 that slopes upwardly towards the head end 21 and allows the cylindrical shaft 23 to be press fitted into the handle bar 12 end 12a with the teeth 24 ends initially flexed and then flex outwardly to engage and bind into the handle bar interior wall, blocking cap withdrawal. So arranged, the cushioning hand grip 10 end 22 is maintained by cap 20 onto a handle bar 12, providing shock absorbency and cushioning to the operator whose fingers 30 are wrapped therearound, as shown in FIG. 8.

Additionally, as shown in FIG. 8, to provide, as needed, stiffness to the cushioning hand grip 10, the grip can be formed around a sleeve 27 that is constructed from a stiffer material than the preferred polymer material as is used to form the cushioning hand grip, as set out hereinabove. Which stiffer material is preferably a nylon sleeve that is approximately the length of the sleeve 18 and will both act as a grip stiffener and as a binding surface against the handle bar end 12 surface, discouraging the cushioning hand grip 10 from sliding along the handle bar end 12.

A preferred embodiment of the cushioning hand grip of the invention has been shown and described above. It will, however, be apparent to one knowledgeable or skilled in the art that the above describe embodiment may incorporate changes and modifications without departing from the general scope of this invention. Which invention is therefore intended to include all such modifications and alterations in so far as they come within the scope of the appended claims and/or a reasonable equivalence thereof.

I claim:

1. A cushioning hand grip for mounting onto a handle bar end portion comprising, a sleeve formed from an elastomer polymer compound of OH (hydroxyl) that contains polymers that are reacted with Methylene Diisocyanate as an NCO, and contains an isocyanate producing a material having a vio-elastic character selected to provide a non-slip adherence to a cylindrical surface whereover said sleeve is fitted and to afford both flexure and shock absorbency to the hand of an operator gripping said sleeve, and includes longitudinal and lateral equal spaced dimples projecting outwardly from around and along an outer surface of said sleeve, with spaces between said dimples to provide air and liquid flow paths; and a cap arranged for fitting into an end of said sleeve.

2. The cushioning gand grip as recited in claim 1, wherein the cap is formed for fitting over an end of the sieeve and into a longitudinal opening whereround the cylindrical surface is formed and includes a shaft for fitting over an end of said sleeve and into the cylindrical surface and includes a shaft for fitting and locking into the longitudinal opening of said cylindrical surface, blocking removal of said sleeve.

3. The cushioning hand grip as recited in claim 1, wherein the dimples are flat squares and project outwardly from one thirty second (1/32) to one eighth (1/8) of an inch outwardly from the sleeve outer surface.

4. The cushioning hand grip as recited in claim 3, wherein the dimples project outwardly one eighth (1/8) of an inch from the sleeve outer surface.

5. The cushioning hand grip as recited in claim 1, wherein the distance between a dimple and the adjoining dimple is approximately three quarters (3/4) of an inch.

6. The cushioning hand grip as recited in claim 1, wherein the sleeve inner surface tapers at a slope of from fifteen (15) to twenty (20) degrees from approximately one half (1/2) an inch inward from the p end as is first installed onto a cylindrical surface open end.

7. The cushioning hand grip as recited in claim 6, further including a reinforcing sleeve for fitting within the elastomer polymer compound sleeve formed from a section of nylon material and has approximately the same length as said elastomer polymer compound sleeve.

8. The cushioning hand grip as recited in claim 1, further including a reinforcing sleeve wherearound the elastomer polymer compound sleeve is formed.

* * * * *